United States Patent
Leproust et al.

(10) Patent No.: US 7,247,337 B1
(45) Date of Patent: Jul. 24, 2007

(54) METHOD AND APPARATUS FOR MICROARRAY FABRICATION

(75) Inventors: Eric M. Leproust, Campbell, CA (US); Lalitha Reddy, Los Gatos, CA (US); Michel G M Perbost, Bethany, CT (US)

(73) Assignee: Agilent Technologies, Inc., Santa Clara, CA (US)

(*) Notice: Subject to any disclaimer, the term of this patent is extended or adjusted under 35 U.S.C. 154(b) by 175 days.

(21) Appl. No.: 10/322,280

(22) Filed: Dec. 16, 2002

(51) Int. Cl.
*A61L 33/00* (2006.01)
*B05D 3/00* (2006.01)

(52) U.S. Cl. ............... 427/2.1; 427/2.11; 427/2.13; 427/154; 427/301; 427/331; 427/333; 427/337; 427/372.2; 427/384; 427/389.7; 427/407.1; 427/414

(58) Field of Classification Search ............... 427/2.1, 427/2.11, 2.13, 154, 301, 331, 333, 337, 372.2, 427/384, 389.7, 407.1, 414
See application file for complete search history.

(56) References Cited

U.S. PATENT DOCUMENTS

| | | | |
|---|---|---|---|
| 4,458,066 A | | 7/1984 | Caruthers et al. |
| 4,500,707 A | | 2/1985 | Caruthers et al. |
| 4,518,562 A | * | 5/1985 | Deitz ..................... 376/313 |
| 5,153,319 A | | 10/1992 | Caruthers et al. |
| 5,449,754 A | | 9/1995 | Nishioka |
| 5,472,480 A | * | 12/1995 | Barbe ..................... 95/54 |
| 5,807,522 A | | 9/1998 | Brown et al. |
| 5,869,643 A | | 2/1999 | Chatelain et al. |
| 6,015,880 A | * | 1/2000 | Baldeschwieler et al. ... 530/333 |
| 6,171,797 B1 | | 1/2001 | Perbost |
| 6,180,351 B1 | | 1/2001 | Cattell |
| 6,232,072 B1 | | 5/2001 | Fisher |
| 6,242,266 B1 | | 6/2001 | Schleifer et al. |
| 6,355,216 B1 | * | 3/2002 | Kristiansson et al. ......... 422/29 |
| 6,362,718 B1 | | 3/2002 | Patrick et al. |
| 6,419,883 B1 | * | 7/2002 | Blanchard .................. 422/134 |
| 6,590,633 B1 | * | 7/2003 | Nishi et al. .................. 355/53 |
| 2003/0118718 A1 | * | 6/2003 | Hilson et al. .............. 427/2.11 |

FOREIGN PATENT DOCUMENTS

| | | |
|---|---|---|
| EP | 0 294 196 | 3/1996 |
| WO | WO 95/25116 | 9/1995 |
| WO | WO 98/41531 | 9/1998 |

OTHER PUBLICATIONS

Terra Universal website.*
Itakura et al., "Synthesis and Use of Synthetic Oligonucleotides", Annual Review of Biochemistry, 1984, vol. 53, pp. 323-356.
Pan et al., "Model Compound Studies on the Cleavage of Glycosidic Bonds by Ozone in Aqueous Solution", Research on Chemical Intermediates, 1995, vol. 21, pp. 205-222.
Ouederni et al., "Ozone Decomposition on Glass and Silica", Ozone: Science & Enginenring, 1996, vol. 18, pp. 385-415.

(Continued)

*Primary Examiner*—Elena Tsoy

(57) ABSTRACT

The invention provides a method and apparatus for micro array fabrication exclusive from the impact of a gas. A housing with a gas free chamber provides for improved micro array fabrication with a lower defect rate. The invention provides a housing that excludes a gas such as ozone to prevent interaction with probe construction or attachment. A method of fabricating a micro array in an ozone free environment is also disclosed.

14 Claims, 8 Drawing Sheets

OTHER PUBLICATIONS

Dhandapani et al., "Gas Phase Ozone Decomposition Catalysts", Applied Catalysis B: Evironmental, 1997, vol. 11, pp. 129-166.

Elovitz et al., "Hydroxyl Radical/Ozone Ratios During Ozonation Processes. II. The Effect of Temperature, pH, Alkalinity, and DOM Properties", Ozone Science & Engineering, 2000, vol. 22, pp. 123-150.

Caruthers, "Gene Synthesis Machines: DNA Chemistry and Its Uses", Science, 1985, vol. 230, pp. 281-285.

Knorre et al., "Design and Targeted Reactions of Oligonucleotide Derivatives", CRC Press, 1994, pp. 100-151.

* cited by examiner

METHOD AND APPARATUS FOR MICROARRAY FABRICATION

FIELD OF THE INVENTION

The present invention relates to the field of nucleic acids and more particularly to a method for producing improved fabrication of micro array devices.

BACKGROUND OF THE INVENTION

Various arrays of polynucleotides (such as RNA and DNA) are known and used in genetic testing, screening and diagnostics. Arrays are defined by the regions of different biopolymers or nucleotides arranged in a predetermined configuration on a substrate. Most importantly, the arrays when exposed to a population of analytes will exhibit a pattern indicative of the presence of the various components separated spatially. Array binding patterns of polynucleotides and/or peptides can be detected by using a variety of suitable target labels. Once bound to the array, these target labels can then be quantified and observed and the overall pattern on the array determined.

A number of methods have been designed for manufacturing micro arrays. DNA micro arrays are particularly useful for analyzing large sets of genes through "gene expression profiling". Using various techniques, arrays can be used to effectively analyze genomes and portions of genomes. Probe arrays have been produced by a variety of means. However, two major methods exist for fabricating arrays used in expression profiling. The first technique uses chemical methods to synthesize polynucleotide probes in situ on array surfaces. This technique uses addressable adaptations of phosphoramidite chemistry. In the second method, polynucleotide probes synthesized enzymatically or chemically can be deposited and attached to a surface through covalent or non-covalent means. The enzymatic method is particularly effective in fabricating arrays with larger probes of 100-1000 nucleotides.

A number of steps are used in the fabrication of the micro arrays designed in the in situ process. The first step in the in situ process is to deposit a polymeric layer on top of a glass substrate or similar type material. Once the polymeric layer has been deposited phosphoramidite chemistry is used to build the oligonucleotides on the micro arrays in a step-wise fashion. This is accomplished by adding one monomer at a time until the final polynucleotide is constructed. The steps of construction using these methodologies are well known in the art and generally include a coupling step followed by a series of capping, oxidation and deblocking steps. The final constructed oligonucleotide can then be employed for binding targets of known or unknown sequences.

Other methods are known in the art that can also be used for fabricating micro arrays. For instance, oligonucleotides or oligonucleotide fragments have been deposited directly on polymer surfaces. After the deposition process the deposited oligonucleotides are then subjected to a drying step and final curing step. The curing step includes the application of heat, UV light or other similar physical or chemical methods to cross-link the polynucleotides to the surface. Processes have also been designed in which cDNA is used in place of polynucleotides and their fragments.

The above methods have been employed for constructing micro arrays in various sizes and designs. However, in the fabrication process a number of problems have arisen. Problems are largely due to incorrect fabrication of oligonucleotides, ineffective chemistries, missing or extra nucleotide bases added and degradation of the oligonucleotides on the surface of the micro array(s). As a result, being able to scale up the fabrication process becomes quite difficult. In addition, a number of the micro arrays need to be discarded due to these existing defects. It, therefore, would be desirable to be able to quickly, efficiently and cost effectively fabricate micro arrays that have a lower number of defects or defective designs. These and other problems with the prior art processes and designs are obviated by the present invention. The references cited in this application infra and supra, are hereby incorporated in this application by reference. However, cited references or art are not admitted to be prior art to this application.

SUMMARY OF THE INVENTION

The invention provides a method and apparatus for improved fabrication of a micro array device. The micro array device is fabricated in the absence of a gas such as ozone. The apparatus of the present invention comprises a housing, a micro array substrate disposed in the housing, probes for attaching to the micro array substrate to build the micro array and a filter associated with the housing for removing a gas from the housing. The gas removal allows for improved micro array fabrication with lower defect rates. The method for fabricating the micro array comprises constructing the micro array in an ozone free environment.

BRIEF DESCRIPTION OF THE DRAWINGS

Embodiments of the invention will now be described with reference to the drawings in which.

DETAILED DESCRIPTION OF THE INVENTION

Figure 1:
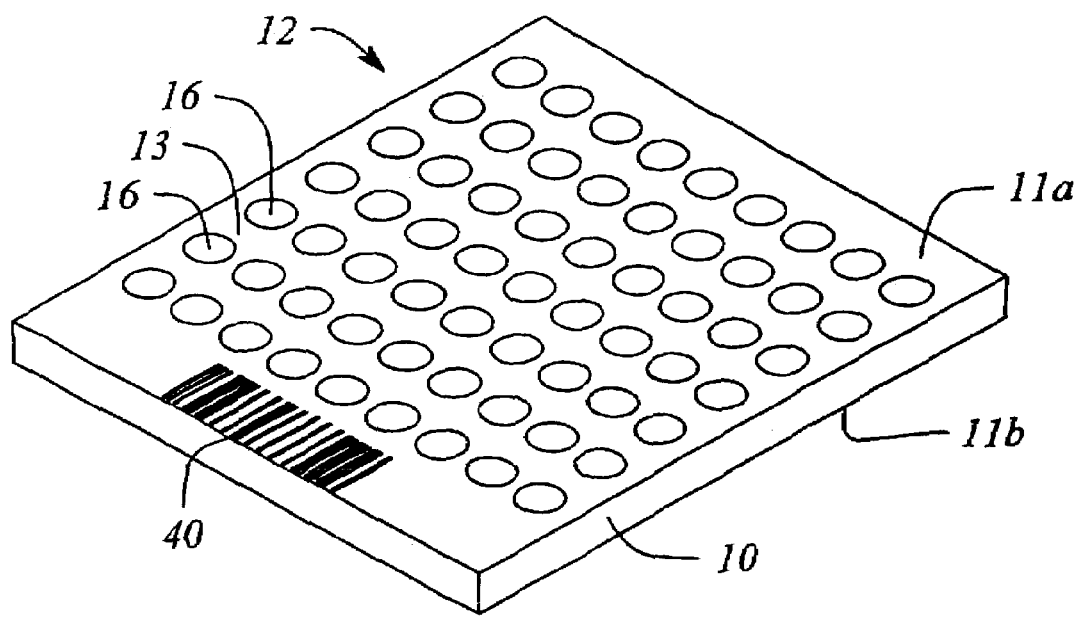
FIG. 1 illustrates a single nucleotide polymorphic array.

Before describing the present invention in detail, it is to be understood that this invention is not limited to specific compositions, process steps, or equipment, as such may vary. It is also to be understood that the terminology used herein is for the purpose of describing particular embodiments only, and is not intended to be limiting. Methods recited herein may be carried out in any order of the recited events that is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

Unless defined otherwise below, all technical and scientific terms used herein have the same meaning as commonly understood by one of ordinary skill in the art to which this invention belongs. Still, certain elements are defined herein for the sake of clarity.

It must be noted that, as used in this specification and the appended claims, the singular forms "a", "an" and "the" include plural referents unless the context clearly dictates otherwise. Thus, for example, reference to "an array" includes more than one array, reference to "a polynucleotide" includes a plurality of polynucleotides and the like.

In describing and claiming the present invention, the following terminology will be used in accordance with the definitions set out below.

An "array", "micro array" or "micro array device" refers to any two-dimensional or substantially two-dimensional arrangement of addressable regions bearing a particular chemical moiety or moieties (e.g., biopolymers such as polynucleotide sequences (nucleic acids), polypeptides (e.g., proteins), etc.) associated with that region. In the broadest sense, the preferred arrays are arrays of polymeric binding agents, where the polymeric binding agents may be any of: polypeptides, proteins, nucleic acids, polysaccharides, synthetic mimetics of such biopolymeric binding agents, etc. In many embodiments of interest, the arrays are arrays of nucleic acids, including oligonucleotides, polynucleotides, cDNAs, mRNAs, synthetic mimetics thereof, and the like. Where the arrays are arrays of nucleic acids, the nucleic acids may be covalently attached to the arrays at any point along the nucleic acid chain, but are generally attached at one of their termini (e.g. the 3' or 5' terminus). Sometimes, the arrays are arrays of polypeptides, e.g., proteins or fragments thereof.

An array is "addressable" when it has multiple regions of different moieties (e.g., different polynucleotide sequences) such that a region (i.e., a "feature" or "spot" of the array) at a particular predetermined location (i.e., an "address") on the array will detect a particular target or class of targets (although a feature may incidentally detect non-targets of that feature). Array features are typically, but need not be, separated by intervening spaces. In the case of an array, the "target" will be referenced as a moiety in a mobile phase (typically fluid), to be detected by probes ("target probes") which are bound to the substrate at the various regions. However, either of the "target" or "target probe" may be the one that is to be evaluated by the other (thus, either one could be an unknown mixture of polynucleotides to be evaluated by binding with the other). An "array layout" refers to one or more characteristics of the features, such as feature positioning on the substrate, one or more feature dimensions, and an indication of a moiety at a given location. "Hybridizing" and "binding", with respect to polynucleotides, are used interchangeably.

A "biopolymer" is a polymer of one or more types of repeating units. Biopolymers are typically found in biological systems and particularly include polysaccharides (such as carbohydrates), peptides (which term is used to include polypeptides and proteins) and polynucleotides as well as their analogs such as those compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions. Polynucleotides include single or multiple stranded configurations, where one or more of the strands may or may not be completely aligned with another. A "nucleotide" refers to a sub-unit of a nucleic acid and has a phosphate group, a 5 carbon sugar and a nitrogen containing base, as well as functional analogs (whether synthetic or naturally occurring) of such sub-units which in the polymer form (as a polynucleotide) can hybridize with naturally occurring polynucleotides in a sequence specific manner analogous to that of two naturally occurring polynucleotides. Biopolymers include DNA (including cDNA), RNA, oligonucleotides, and PNA and other polynucleotides as described in U.S. Pat. No. 5,948,902 and references cited therein (all of which are also incorporated herein by reference), regardless of the source. An "oligonucleotide" generally refers to a nucleotide multimer of about 10 to 100 nucleotides in length, while a "polynucleotide" includes a nucleotide multimer having any number of nucleotides. A "biomonomer" references a single unit, which can be linked with the same or other biomonomers to form a biopolymer (e.g., a single amino acid or nucleotide with two linking groups one or both of which may have removable protecting groups).

A "chamber" refers to an enclosed volume (although a chamber may be accessible through one or more ports).

A "fabrication facility" refers to any facility or laboratory that is designed for the construction and/or manufacturing of micro arrays. These facilities generally include systems for chemically preparing micro array devices. It is within the scope of the applicant's invention to include facilities that may include various construction steps and instrumentation that may be different from those disclosed here. However, what is important is that the construction of the micro array is in some way improved by the removal of a contaminating gas component such as ozone that may interact with the micro array and effect overall quality or stability of the final manufactured micro array device.

The term "filter" shall have a broad based meaning and refers to various chemical and physical means for removing a particular gas molecule from a housing. Chemical reactions may or may not take place on a physical substrate. Chemical reactions could include catalytic decomposition and manganese oxide reactions as well as other reactions well known in the art. Physical means include devices that can remove a molecule of a defined gas by its structure or by a chemical reaction on its structure or substrate. An example of such a device could be a carbon filter.

A "housing" refers to various size and sided enclosures. Enclosures can range in size from a nanobox to as big as a fabrication facility. Some typical housings may include a glove box, fabrication facility, plastic container, metal container, corrugated box, and a cardboard container.

"Hybridizing", "annealing" and "binding", with respect to polynucleotides, are used interchangeably. "Binding efficiency" refers to the productivity of a binding reaction, measured as either the absolute or relative yield of binding product formed under a given set of conditions in a given amount of time. "Hybridization efficiency" is a particular sub-class of binding efficiency, and refers to binding efficiency in the case where the binding components are polynucleotides. It will also be appreciated that throughout the present application, that words such as "upper", "lower" are used in a relative sense only. A "set" may have one type of member or multiple different types. "Fluid" is used herein to reference to a liquid.

A "nucleotide" refers to a sub-unit of a nucleic acid and has a phosphate group, a 5-carbon sugar and a nitrogen containing base, as well as analogs of such sub-units. An "oligonucleotide" generally refers to a nucleotide multimer of about 10 to 100 nucleotides in length, while a "polynucleotide" includes a nucleotide multimer having any number of nucleotides.

A "probe" or "micro array probe" refers to a biopolymer such as a nucleic acid, nucleotide, nucleoside or their analogs. The term shall also include nucleotides having modified sugars as well as organic and inorganic leaving groups attached to the purine or pyrimidine rings. For purposes of this application a "probe" may or may not include the use of an optional "stilt".

A "remote location," refers to a location other than the location at which the array is present and hybridization occurs. For example, a remote location could be another location (e.g., office, lab, etc.) in the same city, another location in a different city, another location in a different state, another location in a different country, etc. As such, when one item is indicated as being "remote" from another, what is meant is that the two items are at least in different rooms or different buildings, and may be at least one mile, ten miles, or at least one hundred miles apart. "Communicating" information references transmitting the data representing that information as electrical signals over a suitable communication channel (e.g., a private or public network). "Forwarding" an item refers to any means of getting that item from one location to the next, whether by physically transporting that item or otherwise (where that is possible) and includes, at least in the case of data, physically transporting a medium carrying the data or communicating the data.

A "stilt" or "stilted" refers to any biopolymer that is used to raise the micro array hybrids and nucleotides off of the micro array surface. For instance, a 45 mer often uses a 20 mer stilt attached to a 25 mer nucleotide polymer. A 60 mer uses a 35 mer stilt attached to a 25 mer nucleotide polymer (See FIG. 4). The stilt attaches to the array surface and the nucleotide polymer is then attached to the stilt. The stilt may comprise a variety of chemical moieties. The stilt provides an attachment point for the nucleotide polymer that is away from the array surface. It also allows the nucleotide polymer to be extended away from the array surface.

A "substrate surface" or "first substrate surface" are synonymous and refer to the surface or material that a probe may be attached or constructed.

A "target" refers to a biopolymer such as a nucleotide, nucleoside or their analogs. The term shall also include nucleotides having modified sugars as well as organic and inorganic leaving groups attached to the purine or pyrimidine rings.

Figure 2:
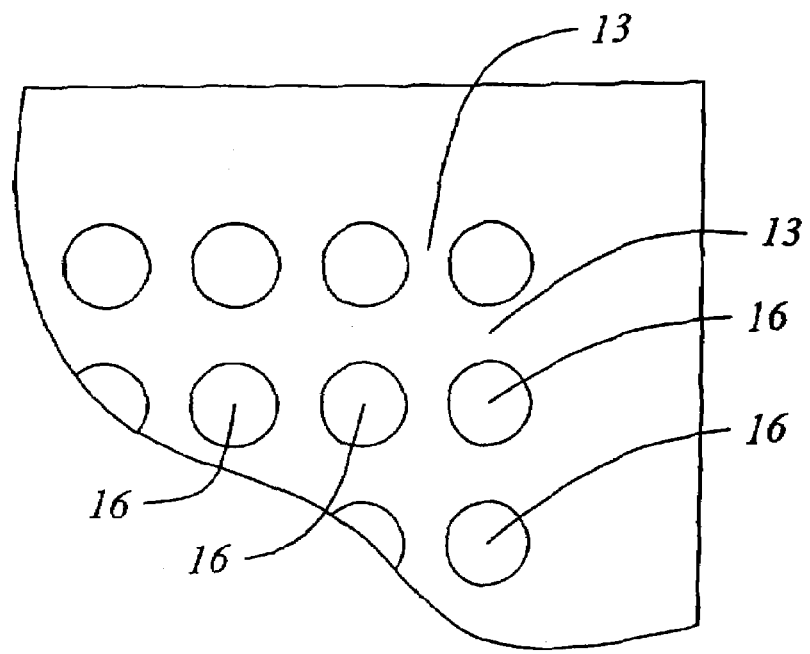
FIG. 2 is an enlarged view of a portion of FIG. 1 showing multiple spots or regions of one array.
Figure 3:
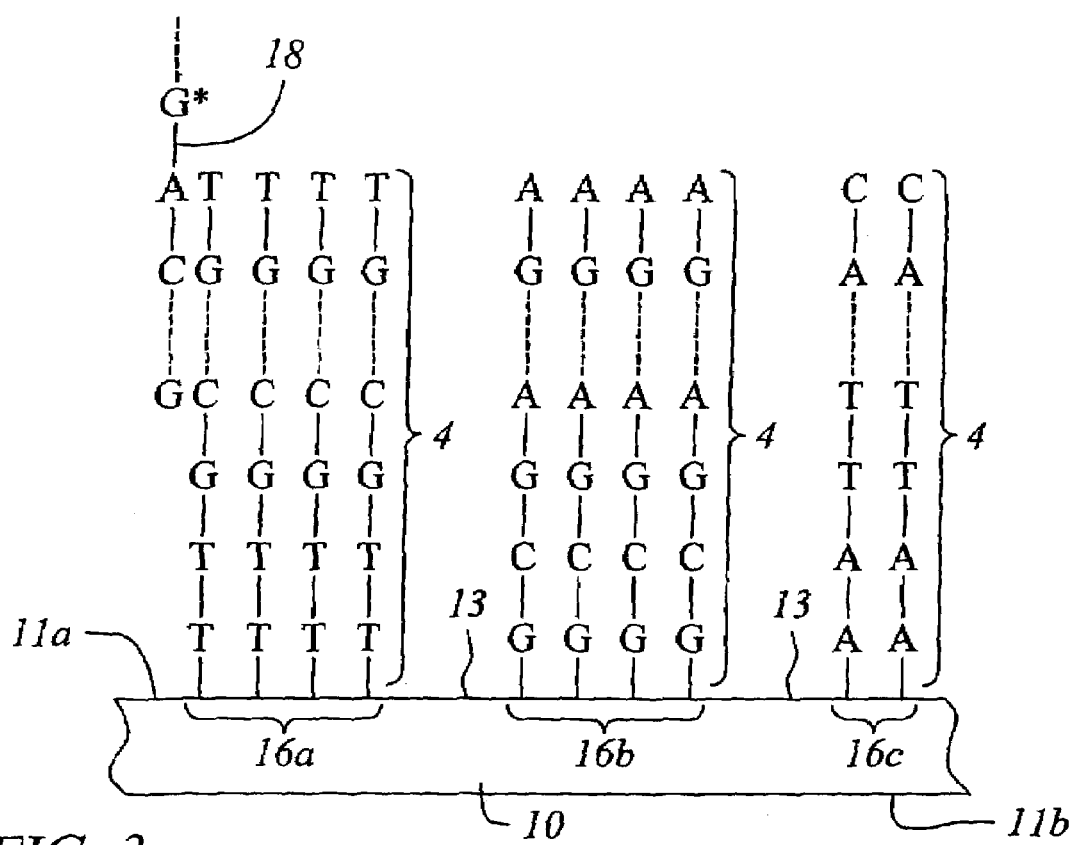
FIG. 3 shows an enlarged view of a portion of FIG. 1 showing the design of the micro array polymeric strands.

Referring now to the figures, FIGS. 1-3 show a micro array 12 in the form of a contiguous, substantially planar substrate 10 that carries multiple features 16 disposed across a first substrate surface 11a of substrate 10 separated by inter feature areas 13. The substrate may be made of transparent material to facilitate data acquisition scanning there through. The features 16 are shown disposed in a pattern that defines the array. The extent of the pattern defines a scan region (not labeled in the figures). A second substrate surface 11b does not carry any features.

A typical array usually includes at least two distinct polymers that differ by monomeric sequences immobilized on (i.e., covalently or non-covalently attached to) different and known locations on the substrate surface, where a space between each location or feature may or may not be present. Each distinct polymeric sequence of the array is typically present as a composition of multiple copies of the polymer on the substrate surface (e.g. as a spot or feature 16 on the surface of the substrate). The number of distinct polymeric sequences, and hence the features 16, present on the slide or substrate may vary, but is generally at least 10, where the number may be as high as at least 50, 100, 500, 1000 or 10,000. The density of features present on the array surface may vary, but will generally be at least about 10 and usually at least about 100 spots/cm$^2$, where the density may be as high as $10^6$ or higher, but will generally not exceed about $10^5$ spots/cm$^2$.

While all of the features 16 may be of different composition, some could be the same (e.g., when any repeats of each feature composition are excluded the remaining features may account for at least 5%, 10%, or 20% of the total number of features). In any event, each feature carries probes in the form of a moiety or mixture of moieties, which in the case of each feature 16 in FIGS. 1-3 is preferably a polynucleotide having a particular sequence, while the inter feature areas 13 do not carry any moieties of a type the same as the features 16 (i.e., no polynucleotides in the case of the features 16 carrying polynucleotides).

Such an array configuration is illustrated schematically in FIG. 3 where the features 16 are shown as carrying different polynucleotide sequences. The features 16 may have widths (that is, diameter, for a round spot) of at least 5 or 10 μm, and usually less than 1.0 cm. In embodiments where very small spot sizes or feature sizes are desired, each of the features 16 may have widths of at least 1.0 μm and less than 1.0 mm, usually less than 500 μm, and more usually less than 200 μm. Features that are not round may have areas equivalent to the area ranges of round features 16 resulting from the foregoing diameter ranges. The probes of the features 16 are typically linked to the substrate 10 through a suitable linker (not shown).

The micro array 12 may cover an area of less than 100 cm$^2$, or even less than 50, 10 or 1 cm$^2$. In many embodiments, the substrate 10 will be shaped generally as a rectangular solid (although other shapes are possible), having a length of more than 4 mm and less than 1 m, usually more than 4 mm and less than 600 mm, more usually less than 400 mm; a width of more than 4 mm and less than 1 m, usually less than 500 mm and more usually less than 400 mm; and a thickness of more than 0.01 mm and less than 5.0 mm, usually more than 0.1 mm and less than 2 mm and more usually more than 0.2 and less than 1 mm.

It is often desirable to lay down features as close to the edge of the substrate as possible so as to maximize the number of different probes that may be displayed on a given surface area.

A micro array identifier 40 in the form of a bar code in FIG. 1, is associated with the micro array 12, by being provided on the same substrate 10 adjacent to one of the micro arrays 12. In the case where more than one micro array 12 is present on the same substrate 10, a separate identifier can be provided adjacent to each corresponding micro array 12 if desired. The identifier 40 may either contain information on the layout of the micro array 12 or be linkable to a file containing such information in a manner such as described in U.S. Pat. No. 6,180,351. Each identifier 40 for different arrays may be unique so that a given identifier will likely only correspond to one micro array 12 or to a plurality of the micro arrays 12 on the substrate 10. This configuration can be accomplished by making the identifier 40 sufficiently long and incrementing or otherwise varying it for different micro arrays 12 on the substrate 10, or even by selecting it to be globally unique in a manner in which globally unique identifiers are selected as described in U.S. Pat. No. 6,180,351.

Micro arrays 12 such as those of FIGS. 1-3 can be fabricated using drop deposition from pulse-jets of either polynucleotide precursor units (such as monomers) in the case of in situ fabrication, or a previously obtained polynucleotide. Such methods are described in detail in, for example, the previously cited references including U.S. Pat. Nos. 6,242,266, 6,232,072, 6,180,351, 6,171,797, 6,323, 043, U.S. patent application Ser. No. 09/302,898 filed Apr. 30, 1999 by Caren, et al., and the references cited therein. Other drop deposition methods can be used for fabrication, as well. Also, instead of drop deposition methods, other array fabrication method may be used including pin spotting and the techniques described in U.S. Pat. Nos. 5,599,695, 5,753,788, and 6,329,143.

The inter-feature areas 13 need not be present particularly when the arrays are made by light directed methods as described in those patents. In use, a feature can detect a polynucleotide of a complementary sequence by hybridizing to it, such as a polynucleotide 18 being detected by a feature 16a in FIG. 3 (16b and 16c show other sequence features) (the "*" on polynucleotide 18 indicates a label such as a fluorescent label). Use of arrays to detect particular moieties in a sample (such as target sequences) are well known. The layer thickness of the probes 4 at the features 16, together with any detected target to which they are bound, is often less than 500 nm thick, and often less than 200, 100, 50 or 20 nm in thickness.

The first substrate surface 11a of the substrate 10 may be modified with one or more different layers of compounds that serve to modify the properties of the surface in a desirable manner. Such modification layers, when present, will generally range in thickness from a monomolecular thickness to about 1 mm, usually from a monomolecular thickness to about 0.1 mm and more usually from a monomolecular thickness to about 0.001 mm. Modification layers of interest include: inorganic and organic layers such as metals, metal oxides, polymers, small organic molecules and the like. Polymeric layers of interest include layers of: peptides, proteins, polynucleic acids or mimetics thereof (for example, peptide nucleic acids and the like); polysaccharides, phospholipids, polyurethanes, polyesters, polycarbonates, polyureas, polyamides, polyethyleneamines, polyarylene sulfides, polysiloxanes, polyimides, polyacetates, and the like, where the polymers may be hetero- or homopolymeric, and may or may not have separate functional moieties attached thereto (for example, conjugated).

Biopolymer arrays can be fabricated by depositing previously obtained biopolymers (such as from synthesis or natural sources) onto a substrate, or by in situ synthesis methods. Methods of depositing obtained biopolymers include loading then touching a pin or capillary to a surface, such as described in U.S. Pat. No. 5,807,522 or deposition by firing from a pulse jet such as an inkjet head, such as described in PCT publications WO 95/25116 and WO 98/41531, and elsewhere. Such a deposition method can be regarded as forming each feature by one cycle of attachment (that is, there is only one cycle at each feature during which the previously obtained biopolymer is attached to the substrate). For in situ fabrication methods, multiple different reagent droplets are deposited by pulse jet or other means at a given target location in order to form the final feature (hence a probe of the feature is synthesized on the array substrate). The in situ fabrication methods include those described in U.S. Pat. No. 5,449,754 for synthesizing peptide arrays, and in U.S. Pat. No. 6,180,351 and WO 98/41531 and the references cited therein for polynucleotides, and may also use pulse jets for depositing reagents. The in situ method for fabricating a polynucleotide array typically follows, at each of the multiple different addresses at which features are to be formed, the same conventional iterative sequence used in forming polynucleotides from nucleoside reagents on a support by means of known chemistry. This iterative sequence can be considered as multiple ones of the following attachment cycle at each feature to be formed: (a) coupling an activated selected nucleoside (a monomeric unit) through a phosphite linkage to a functionalized support in the first iteration, or a nucleoside bound to the substrate (i.e. the nucleoside-modified substrate) in subsequent iterations; (b) optionally, blocking unreacted hydroxyl groups on the substrate bound nucleoside (sometimes referenced as "capping"); (c) oxidizing the phosphite linkage of step (a) to form a phosphate linkage; and (d) removing the protecting group ("deprotection" or "deblock") from the now substrate bound nucleoside coupled in step (a), to generate a reactive site for the next cycle of these steps. The coupling can be performed by depositing drops of an activator and phosphoramidite at the specific desired feature locations for the array. A final deprotection step is provided in which nitrogenous bases and phosphate group are simultaneously deprotected by treatment with ammonium hydroxide and/or methylamine under known conditions. Capping, oxidation and deprotection can be accomplished by treating the entire substrate ("flooding") with a layer of the appropriate reagent. The functionalized support (in the first cycle) or deprotected coupled nucleoside (in subsequent cycles) provides a substrate bound moiety with a linking group for forming the phosphite linkage with a next nucleoside to be coupled in step (a). Final deprotection of nucleoside bases can be accomplished using alkaline conditions such as ammonium hydroxide, in another flooding procedure in a known manner. Conventionally, a single pulse jet or other dispenser is assigned to deposit a single monomeric unit.

The foregoing chemistry of the synthesis of polynucleotides is described in detail, for example, in Caruthers, *Science* 230: 281-285, 1985; Itakura et al., *Ann. Rev. Biochem.* 53: 323-356; Hunkapillar et al., *Nature* 310: 105-110, 1984; and in "Synthesis of Oligonucleotide Derivatives in Design and Targeted Reaction of Oligonucleotide Derivatives", CRC Press, Boca Raton, Fla., pages 100 et seq., U.S. Pat. No. 4,458,066, U.S. Pat. No. 4,500,707, U.S. Pat. No. 5,153,319, U.S. Pat. No. 5,869,643, EP 0294196, and elsewhere. The phosphoramidite and phosphite triester approaches are most broadly used, but other approaches include the phosphodiester approach, the phosphotriester approach and the H-phosphonate approach. The substrates are typically functionalized to bond to the first deposited monomer. Suitable techniques for functionalizing substrates with such linking moieties are described, for example, in Southern, E. M., Maskos, U. and Elder, J. K., Genomics, 13, 1007-1017, 1992. In the case of array fabrication, different monomers and activator may be deposited at different addresses on the substrate during any one cycle so that the different features of the completed array will have different desired biopolymer sequences. One or more intermediate further steps may be required in each cycle, such as the conventional oxidation, capping and washing steps in the case of in situ fabrication of polynucleotide arrays (again, these steps may be performed in flooding procedure).

Further details of fabricating biopolymer arrays by depositing either previously obtained biopolymers or by the in situ method are disclosed in U.S. Pat. No. 6,242,266, U.S. Pat. No. 6,232,072, U.S. Pat. No. 6,180,351, and U.S. Pat. No. 6,171,797. In fabricating arrays by depositing previously obtained biopolymers or by the in situ method, typically each region on the substrate surface on which an array will be or has been formed ("array regions") is completely exposed to one or more reagents. For example, in either method the array regions will often be exposed to one or more reagents to form a suitable layer on the surface that binds to both the substrate and biopolymer or biomonomer. In in situ fabrication the array regions will also typically be exposed to the oxidizing, deblocking, and optional capping reagents. Similarly, particularly in fabrication by depositing previously obtained biopolymers, it may be desirable to expose the array regions to a suitable blocking reagent to block locations on the surface at which there are no features from non-specifically binding to target.

Figure 4:
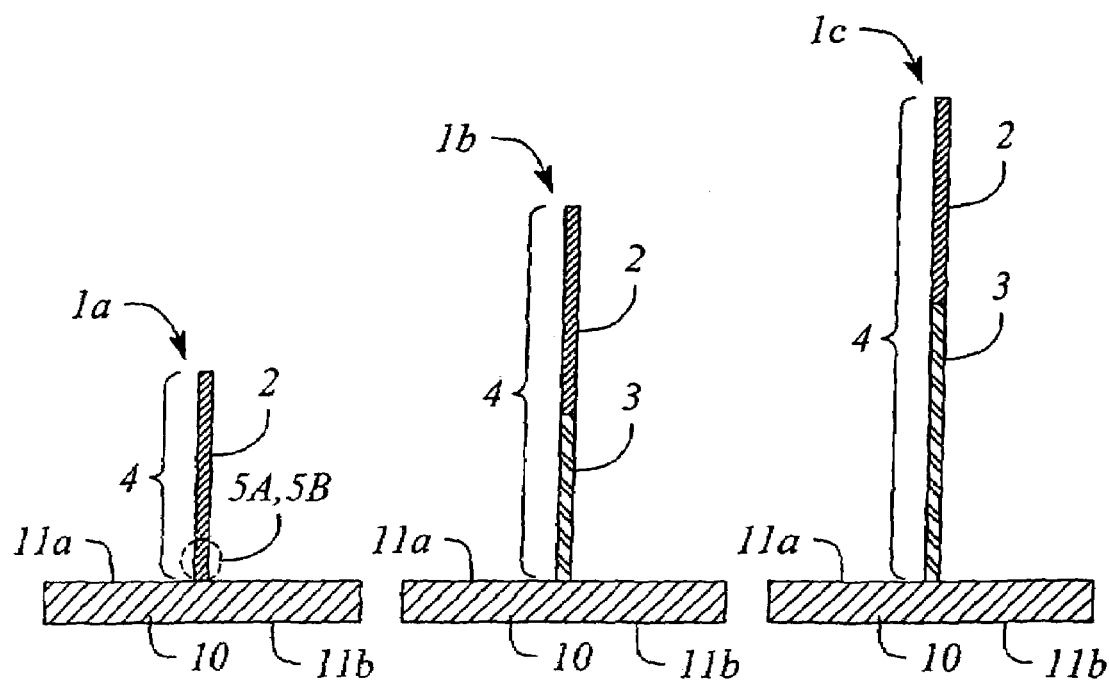
FIG. 4 shows a schematic representation of 25 mer, 45 mer and 60 mer probes on a substrate surface.

FIG. 4 shows a schematic representation of 25 mer (1a), 45 mer (1b) and 60 mer (1c) probes 4 on the first substrate surface 11a. The probes 4 may comprise a nucleotide polymer 2 only (as shown with the 25 mer (1b)) or may comprise an additional biopolymer stilt 3 (shown with the 45 mer (1b) and 60 mer (1c)). In each case the nucleotide polymer 2 that binds to a target such as polynucleotide 18 is a 25 mer in length (See FIG. 4 for clarification). For convenience and clarity each of the various size probes 4 are shown on separate substrates 10.

Typically a biopolymer is attached directly to the first substrate surface 11a. The probes 4 are then attached to this polymer (polymer is not shown in the figures). With the 25 mer the nucleotide polymer 2 contacts the first substrate surface 11a (no stilt is used). An aqueous layer (or multiplayer) is also present close to the surface (not shown in the figures). It is hypothesized that a gas such as ozone may interact with this aqueous layer and form undesirable free radicals or compounds that interact with the micro array 12, degrade the micro array 12 or cause some unwanted side reactions that impinge on the overall stability of the micro arrays 12. The affects are believed to largely be caused by the interaction with the probes 4 (in particular the portion identified as nucleotide polymer 2) of the micro array 12. A likely cause might be due to exposure of the micro array 12 to ozone. Ozone reacts with water according to the following chemical reaction:

$$O_3 + H_2O \longrightarrow 2 \cdot OH + O_2 \tag{1}$$

The two hydroxyl free radicals may then interact with the nucleotide bases closest to the first substrate surface 11a (shown as nucleotide polymer 2 in FIG. 4). Other types of short lived reactive species, such as hydroxyl peroxide free radicals, may also be formed by interaction of a gas such as ozone with aqueous and/or organic substances on the surface. Those species may also react with the nucleotide bases closest to the first substrate surface 11a (shown as nucleotide polymer 2 in FIG. 4).

Figure 5A:
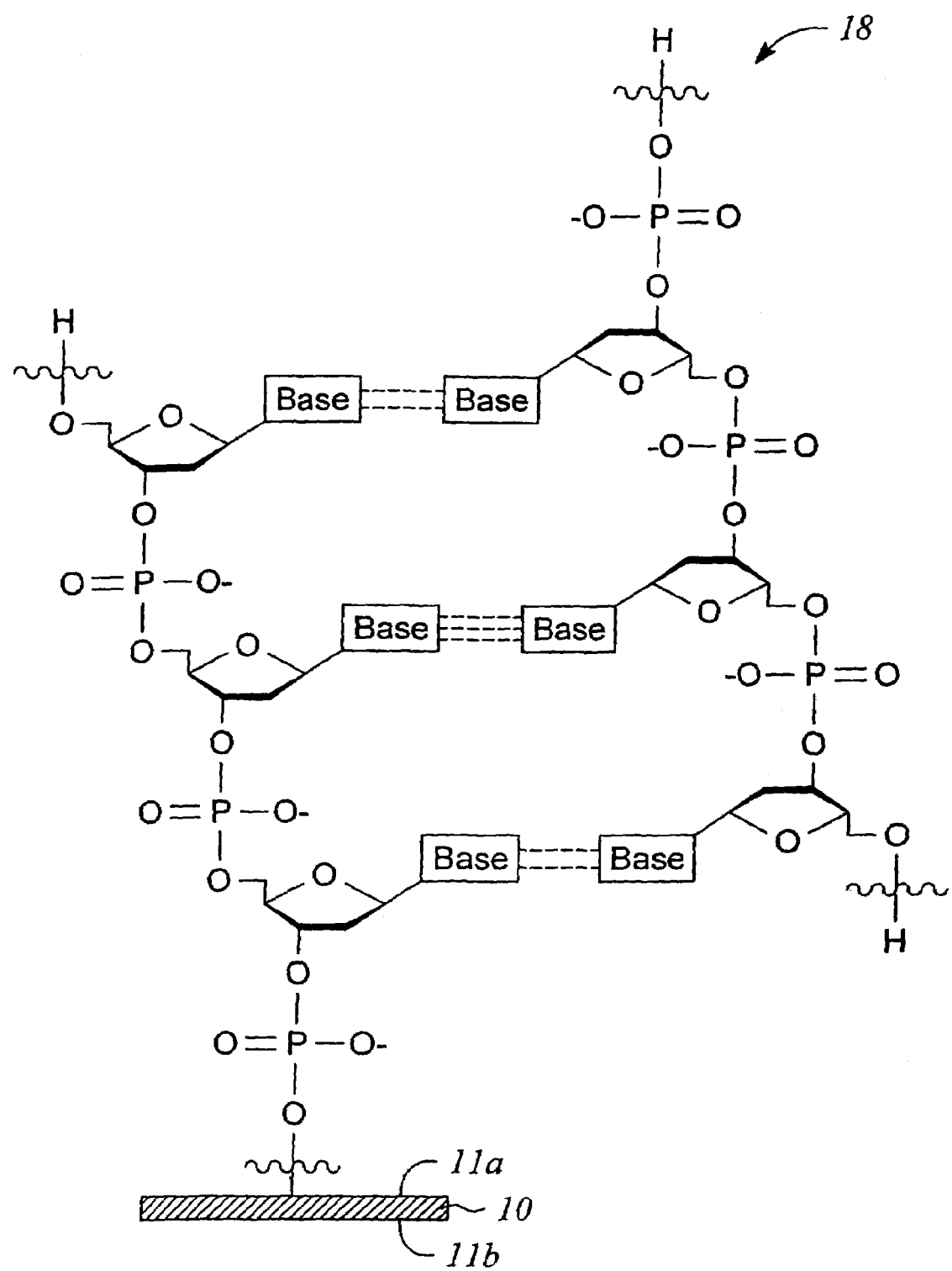
FIG. 5A shows a schematic representation of an enlarged portion of FIG. 4 without the proposed effects of ozone on the probe nucleic acid bases.

FIG. 5A shows a schematic representation of an enlarged portion of FIG. 4 (the 25 mer) and the proposed region where the free radicals or other short lived reactive species might interact with the probes 4 (i.e. nucleotide polymer 2 which comprises the whole portion of probe 4 in FIG. 4,(1a)). FIG. 5A shows the nucleic acid strands without the base modifications. The diagram shows the 25 mer with Watson-Crick base pairing or hydrogen bonding to a target such as polynucleotide 18. The fluorescent tag is not shown in the figure.

Figure 5B:
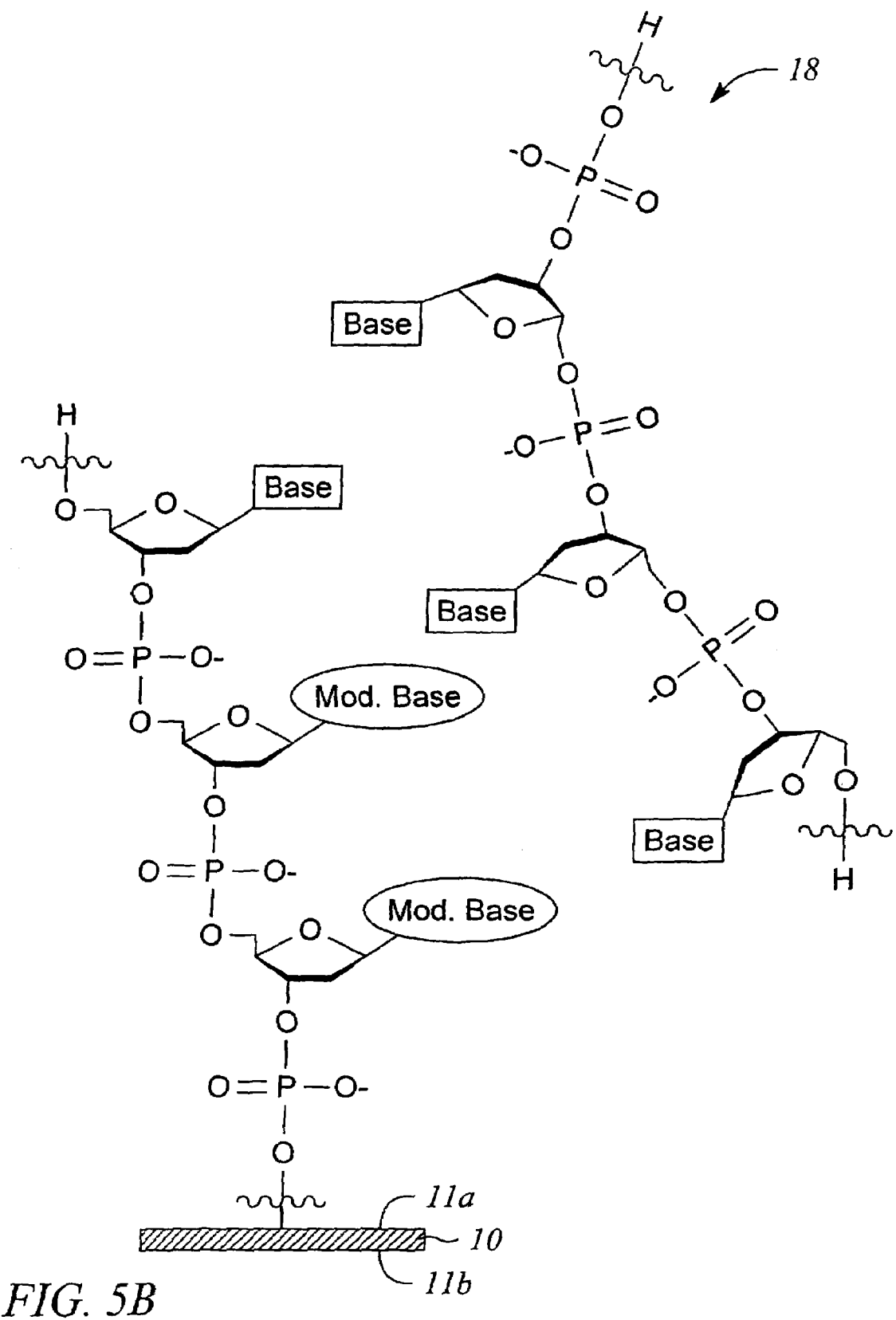
FIG. 5B shows a schematic representation of an enlarged portion of FIG. 4, with the proposed effects of ozone on the probe nucleic acid bases.

FIG. 5B shows the same 25 mer with base modifications after exposure to ozone and the free radicals. In FIG. 5B the probe bases have been modified, and hybridization no longer takes place. Note that damage to the bases of the probes 4 takes place before hybridization. Damages can be directed toward one, or more than one bases. Since the hydroxyl free radicals interact with the nucleotide bases closest to the substrate surface 11a, only the 25 mer hybridization is affected (i.e, the stilts 3 raise the nucleotide polymer portion 2 of the 45 mer and 60 mer away from the first substrate surface 11a). As a result, the overall fluorescence of the 25mer micro array 12 is the only signal lowered due to lack of target and probe hybridization.

Figure 6:
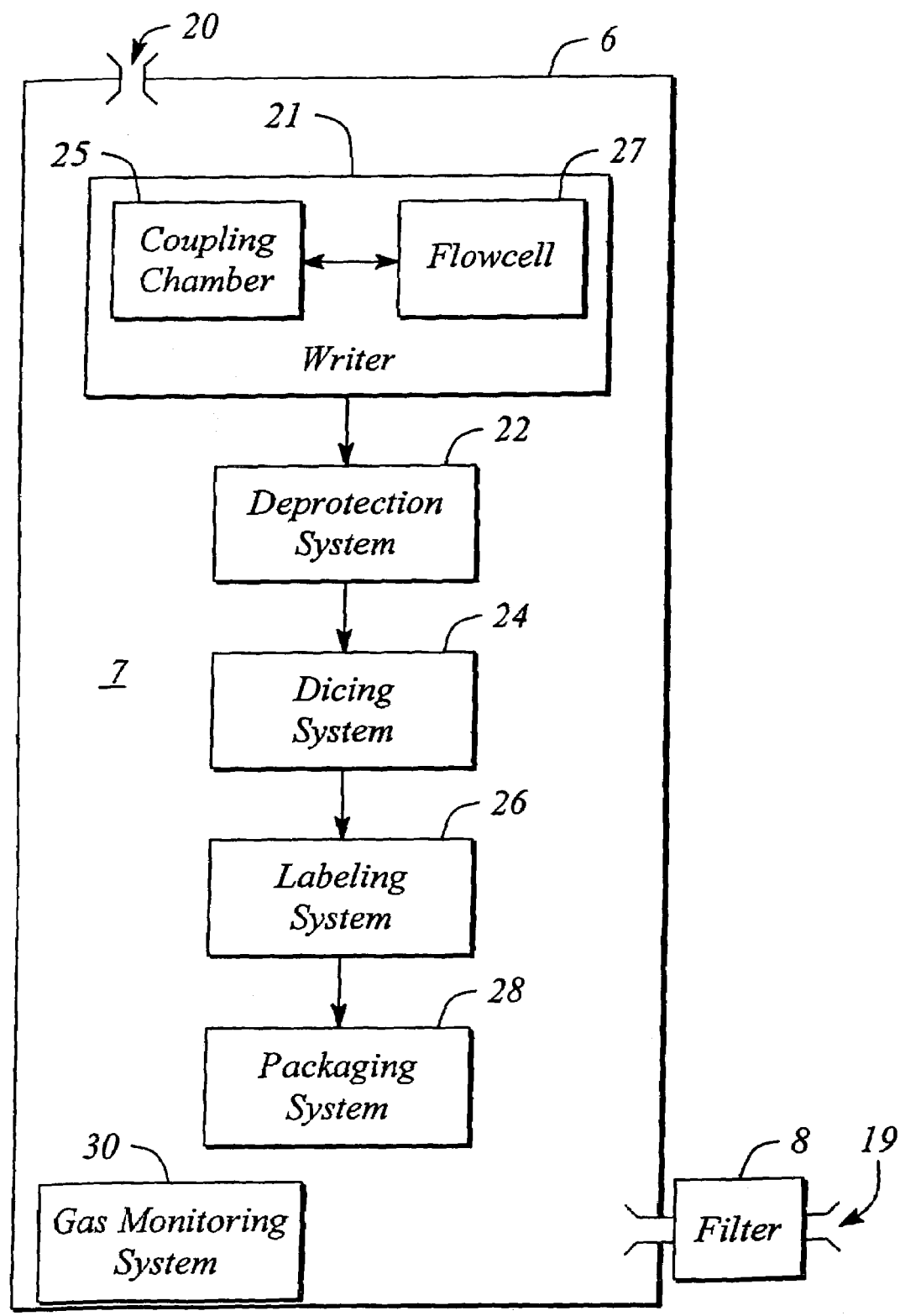
FIG. 6 shows a schematic representation of the apparatus and systems of the present invention.

Referring to FIG. 6, the system of the present invention is more clearly defined. The system comprises a housing 6, a writer 21 comprising a coupling chamber 25 and a flow cell 27, a deprotection system 22, a dicing system 24, a labeling system 26 and a packaging system 28. Each of the systems 22-28 is disposed in the housing 6. The orientation and positioning of each of the systems 22-28 is not important to the invention. It is important to the invention, however, that each system be capable of conducting array fabrication effectively and be positioned within the housing 6 or within similar or separate housings that may be made air tight or can remove an unwanted gas. The systems steps, sequences and order may be altered in a variety of ways known in the art to produce micro array devices.

Writer 21 is designed for depositing or constructing probes on first substrate surface 11a. The deprotection system 22 is designed for the final deprotection of the probes 4 during their construction. The dicing system 24 is designed to separate or dice the micro arrays once the probes 4 have been constructed or assembled onto first substrate surface 11a. The labeling system 26 is designed for labeling the micro arrays 12 that are constructed in the housing 6. The packaging system 28 is designed for packaging and shipping the final micro array product. Each of these systems conducts its tasks in a gas or ozone free environment. Each of the mentioned systems is well known in the art and the details are described elsewhere.

The housing 6 may comprise a variety of shapes, designs and materials that are well known in the art. The housing 6 may be in a variety of sizes. For instance, fabrication of micro arrays 12 may take place in a large size fabrication facility. However, it is also contemplated and within the scope of the invention that such micro array fabrication be conducted on a small scale (i.e., nanoscale). Therefore, the housing 6 may include both large and small designs to facilitate the micro array fabrication process. It should be noted that it is important to the invention that the housing 6 and chamber 7 be capable of excluding unwanted gas molecules. In some cases this means that the housing 6 is capable of being airtight. Chamber 7 may comprise any number of shapes and sizes. However, chamber 7, must be at least large enough to enclose the parts and components necessary for fabrication or design of the micro array 12. The housing 6 may comprise metal or a plastic such as polypropylene, polyethylene or acrylonitrile-butadiene-styrene ("ABS"). It is also within the scope of the invention that the housing 6 be made of a transparent material so as to allow interrogation of the micro array 12 after it has been constructed in the housing 6. Such transparent and non-transparent materials include, for flexible substrates: nylon, both modified and unmodified, nitrocellulose, polypropylene, and the like. For rigid substrates, specific materials of interest include: glass; fused silica, silicon, plastics (e.g., polytetrafluoroethylene, polypropylene, polystyrene, polycarbonate, and blends thereof, and the like); metals (e.g., gold, platinum, and the like). Other materials well known in the art may be used to construct the housing 6.

The housing 6 is designed so that a gas such as nitrogen gas, oxygen, or nitrogen/oxygen mixture may be flowed into the chamber 7 of the housing 6 by an intake port 19 and exhausted from the chamber 7 and the housing 6 by an exit port 20 (this may be done to purge the chamber 7 of an unwanted gas). The intake port 19 and exit port 20 are used to remove unwanted gases and molecules from the housing 6. In a larger scale embodiment, the intake port 19 and the exit port 20 may comprise a series of hoses or lines that provide for circulation, recirculation and/or removal of gases from the chamber 7.

A filter 8 is associated with the housing 6 to remove unwanted gases. The filter 8 may comprise any number of devices, chemical reactions or devices with chemical reactions that may remove ozone or a similar type gas from housing 6. Some chemical reactions/devices include carbon filters, manganese oxide, catalytic decomposition etc. Unwanted gas may include monoatomic, diatomic, triatomic and polyatomic molecules. Some typical gases include and are not limited to ozone, hydrogen, nitrogen, carbon dioxide, carbon monoxide, helium, neon, xenon, chlorine, fluorine, argon etc. It is also possible that the gases include mixtures, trace elements and/or contaminants. The important point of the invention being that an unwanted gas is removed that could interfere with the stability or construction of the micro array 12. An optional gas monitoring system 30 may be used separate or in conjunction with the filter 8. The gas monitoring system 30 may comprise any number of devices that are well known in the art for monitoring gases. Such devices may include an ozone monitoring device. FIG. 6 shows the gas monitoring system 30 disposed within the housing 6. It is not a requirement that the gas monitoring system 30, be disposed within the housing 6. It may be separate or comprise a portion of housing 6. However, it is important that the gas monitoring system 30 be capable of accurately monitoring or determining levels of a particularly identified gas within the housing 6.

The iterative process of array fabrication is performed within the chamber 7 of the housing 6. Unfortunately, this process can allow for diffusion of unwanted gases into the chamber 7. This is particularly prevalent when the intake port 19 uses re-circulated air or gases from the chamber 7. These gases interfere with the fabrication of the micro array 12 that is constructed within the chamber 7 of the housing 6. To avoid these problems, chamber 7 is under positive pressure with respect to the pressure outside housing 6.

Having described the apparatus and systems of the present invention, a description of the method of array fabrication is now in order. The method of the present invention comprises constructing the micro array 12 in an ozone free environment. The ozone free environment allows for improved micro array fabrication. Each of the important systems is shown in FIG. 6. The general method of micro array fabrication in the housing 6 will now be described.

First, the writer 21 is used to construct or deposit the probes 4 on the first substrate surface 11a. The writer 21 comprises the coupling chamber 25 and the flow cell 27. The micro array 12 is transferred between the coupling chamber 25 and the flow cell 27. In the coupling chamber 25 additional monomers or nucleotides and a protecting group are added to the probes 4. The micro array 12 is then moved to the flow cell 27 and optionally, capping is performed, the phosphite bond is oxidized, and the protecting group is removed. This process is repeated until the micro array 12 is complete. After the writer 21 has completed its cycle, the micro array 12 is then sent to the deprotection system 22. At the deprotection system 22, the end caps are removed from the polynucleotides, the phosphate protection groups are removed, and the base protection groups are removed. After the deprotection step, the micro arrays 12 are diced by the dicing system 24, labeled by the labeling system 26 and then sent to the packaging system 28. Each of these steps is carried out in the housing 6. For details in the steps in the chemistry procedures see the reference previously cited. The above example is provided for illustrative purposes only. Other techniques and processes known in the art may also be effectively used with the present invention.

EXAMPLE 1

The ozone concentration in an experimental environment (array fabrication facility or enclosed housing) was measured by UV absorption at 254 nm at controlled pressure and temperature using an ozone analyzer (Advanced Pollution Instrumentation, San Diego, Calif.). When ozone levels in the housing and/or fabrication facility needed to be controlled, they were increased using an ozone generator (Zontec, Ogdensburg, N.Y.) interfaced to the ozone analyzer through a computer, or reduced by carbon filter in the intake air of the array fabrication facility or housing.

EXAMPLE 2

Figure 7:
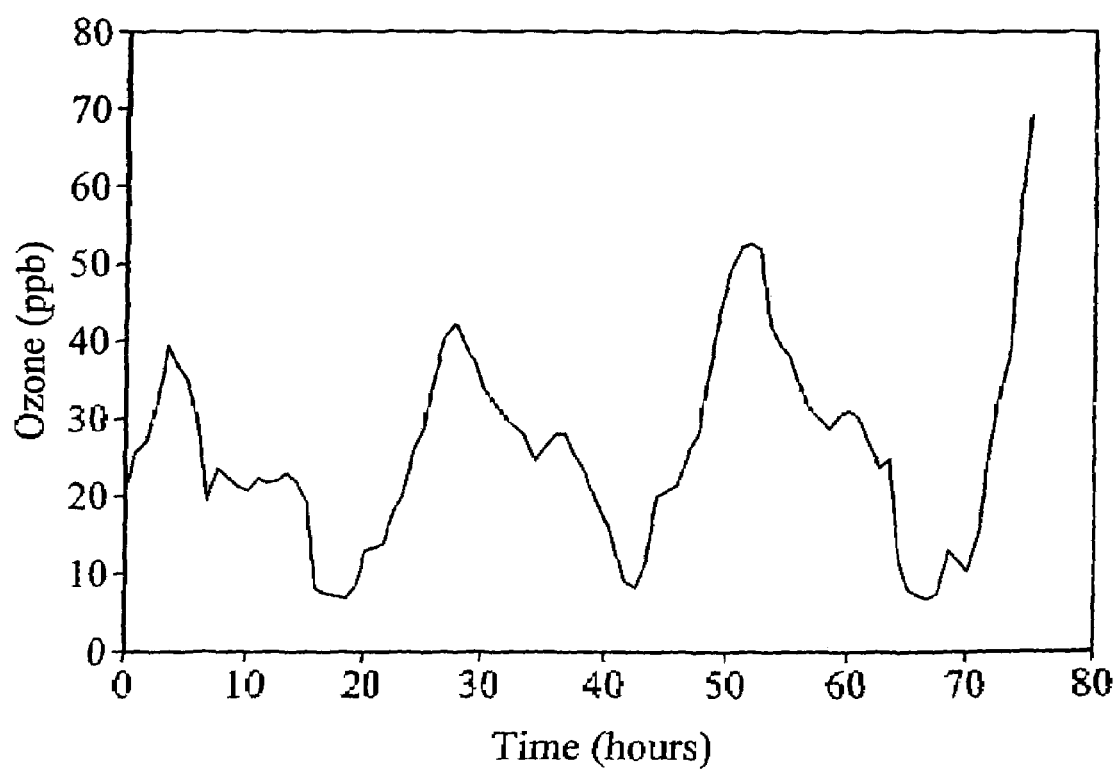
FIG. 7 shows a plot of ozone levels over time (parts per billion) and the relative amounts of ozone that a micro array device might be exposed to during a diurnal cycle.

Levels of ozone that may exist in a sealed housing or array fabrication facility, were tracked over time. Levels or ozone were measured in parts per billion (ppb) for at least two days or more. Of interest were cycles or patterns correlating with cloud cover or exposure to sun. FIG. 7, shows the typical ozone levels measured in an array fabrication facility in Santa Clara county over a period of several days. Ozone levels were measured in Santa Clara County, Calif. starting on Jun. 29, 2001 at 11:00 A.M. for a period of 75 hours. It is apparent that the ozone concentration follows the diurnal cycle of the sun and that its origin derives external to the housing or array fabrication facility. Over twenty hour periods the levels of ozone were highest in the mid afternoon.

EXAMPLE 3

In situ DNA micro arrays were synthesized according to the techniques described previously based on phosphoramidite chemistry. Micro arrays were exposed to the ozone-controlled environment after completion of synthesis (all couplings and deprotections), as well as prior to final deprotection (after all couplings). After exposure of the micro arrays to ozone, those were hybridized and washed according to protocols described above and scanned on and Agilent scanner. Hybridization results were analyzed using Agilent software.

Figure 8:
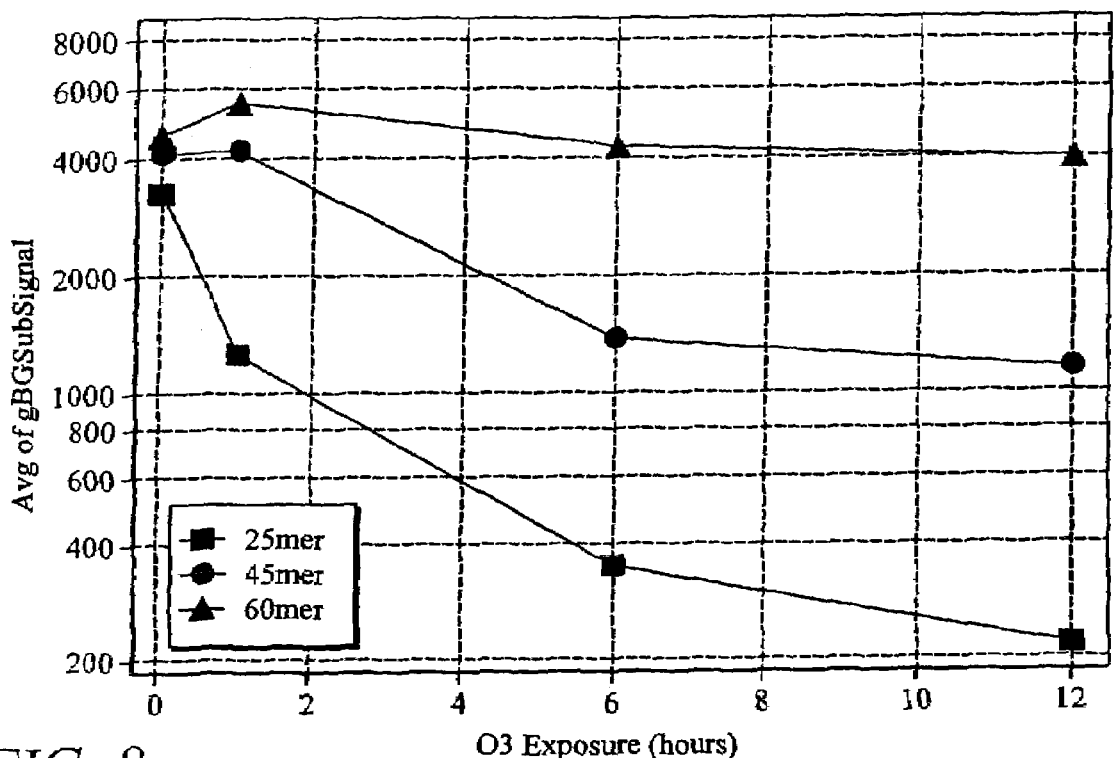
FIG. 8 shows a plot of average hybridization signal of various deprotected polymers (probes) as a function of exposure time at 80 parts per million of ozone.
Figure 9:
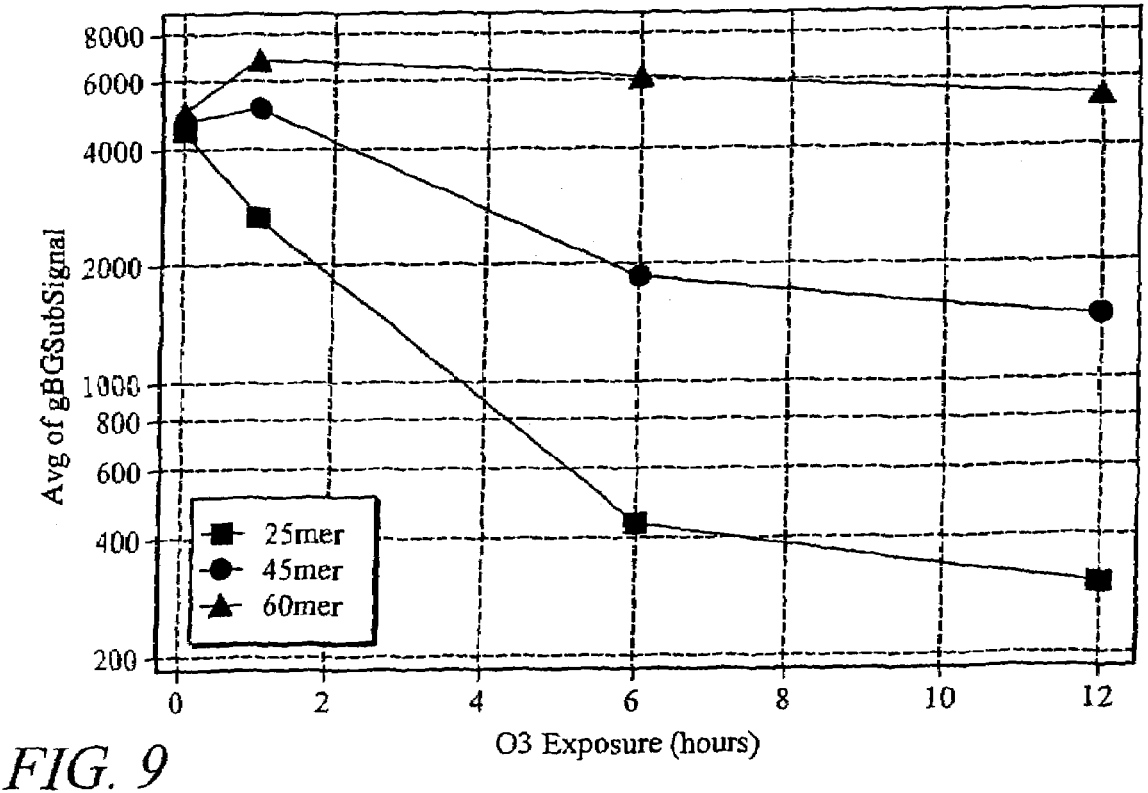
FIG. 9 shows a plot of average hybridization signal of various protected polymers (probes) as a function of exposure time at 80 parts per million of ozone.

FIGS. 8 and 9 show the hybridization signal of a 25 mer sequence synthesized on non-hybridizing stilts of various length (25, 45 and 60 mer) following ozone exposure and hybridization with its fluorescently labeled complementary strand. The hybridization signal indicated that for the probe closest to the surface (25 mer, no stilt) the original sequence was damaged by increasing exposure time to ozone. The damage induced by ozone was also found to be dependent upon the length of the stilt (25>45>60 mer), with the longest stilt providing protection from degradation. In other words the closer the oligonucleotide to the micro array surface, the greater the degradation due to ozone. These results suggested that the surface and/or materials adsorbed to the surface were probably co-reagents to the DNA degradation. For instance, it could be suggested that ozone reacts with layers of water absorbed to the surface of the micro arrays. This reaction creates oxidative species such as hydroxyl radicals and/or hydroxyl peroxide radicals. The observation of damage protection by stilts during ozone exposure is consistent with the reaction between DNA with such short lived species. Because of the high reactivity, the mean travel path of those radicals created at the surface is observed to be smaller than the length of the stilt (~100 Å). No difference in signal reduction was observed between protected and deprotected DNA indicating that: 1) the degradation reaction is independent of the protection groups; and 2) that the micro arrays were ozone sensitive during synthesis, as well as during storage, shipping and use. These results support the conclusion that ozone impacts the fabrication of micro arrays. Overall, the results suggest a general mechanism of reaction where the surface and/or surface absorbed materials act as co-reagents, leading to non-specific modifications of monomers closest to the surface (such as through free radical reactions), without ultimate cleavage of the phosphate bounds. Source of ozone might include UV light, pollution, and electrical discharge in the surrounding environment.

EXAMPLE 4

Figure 10:
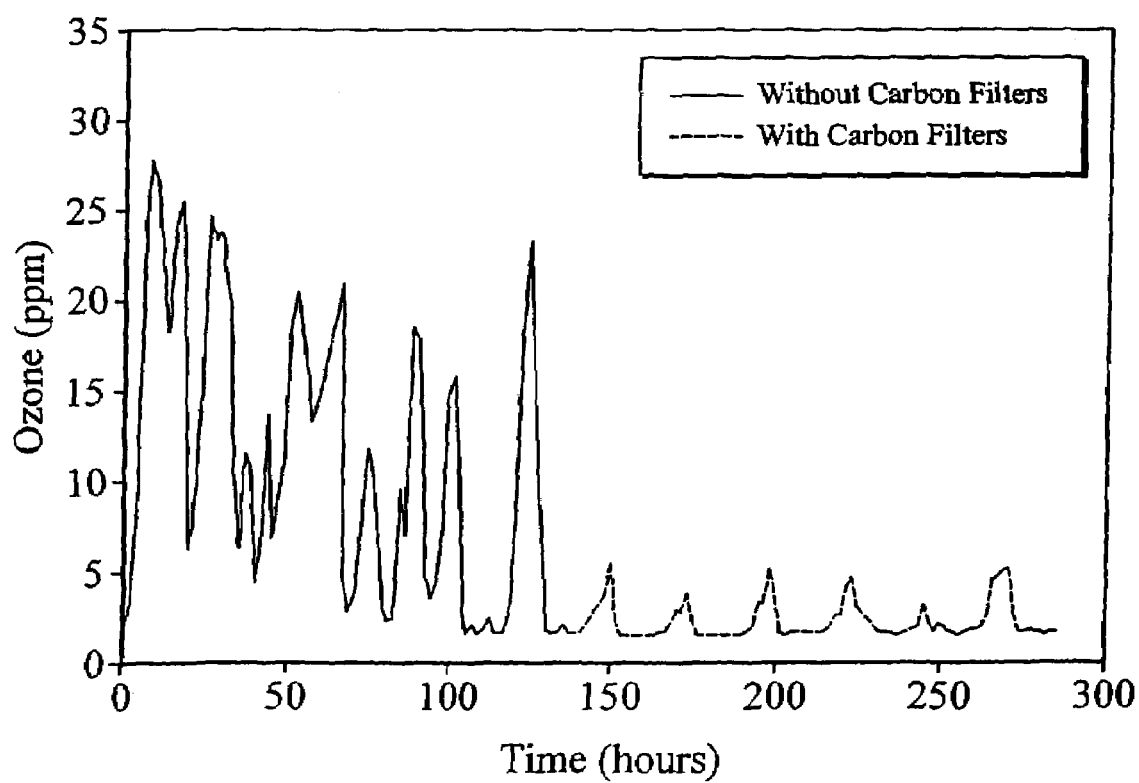
FIG. 10 shows ozone levels measured in an array fabrication facility with and without a carbon filter added to the intake port after 131 hours.

FIG. 10 shows the results of the addition of a filter such as filter 8 to the housing 6 described previously. In particular, the figure shows ozone levels measured in an array fabrication facility in Santa Clara County, Calif. starting on Oct. 26, 2001 at 11:00 A.M. for a period of 295 hours. After 131 hours, carbon filters were installed on the intake port to remove the ozone introduced from the outside. The plots overlap and a dotted line is present on the diagram to show where the carbon filters were engaged. Ozone levels in parts per million were plotted against time exposure in hours. The results indicate that the array fabrication facility or the housing 6 is exposed to ozone and the filter 8 can be used to reduce the overall levels of ozone present in the chamber 7 of the housing 6. Arrays constructed in the ozone free environment showed a much lower defect rate than when the ozone was present.

We claim:

1. A method, comprising:
   removing ozone from an environment by filtration to provide an ozone-reduced environment; and
   fabricating a micro array in said ozone-reduced environment.

2. A method for fabricating a micro array, comprising:
   in an ozone-filtered environment:
   (a) depositing a first polymer on a substrate surface;
   (b) depositing a second polymer on said first polymer;
   (c) drying said polymers; and
   (d) curing said polymers to attach them to said substrate surface.

3. A method for fabricating a micro array, comprising:
   (a) depositing a first polymer on a substrate surface;
   (b) depositing a monomer stepwise on said polymer to produce a second polymer; and
   (c) deprotecting said second polymer in an ozone-filtered environment.

4. A method for fabricating a micro array on a substrate surface, comprising:
   (a) coupling an activated selected nucleoside through a phosphite linkage to said substrate surface to form a substrate bound nucleoside;
   (b) protecting unreacted hydroxyl groups on said substrate bound nucleoside;
   (c) oxidizing said phosphite linkage to form a phosphate linkage; and
   (d) deprotecting said substrate bound nucleoside to generate a reactive site in an ozone-filtered environment.

5. A method as recited in claim 4, wherein steps (a)-(d) are iterative.

6. A method comprising:
   creating an ozone-reduced environment by filtration; and
   fabricating a micro array in said ozone-reduced environment.

7. The method of claim 1, wherein said ozone-reduced environment is contained within a housing.

8. The method of claim 1, wherein said ozone-reduced environment is produced by filtering an atmosphere through a carbon filter.

9. The method of claim 1, further comprising monitoring ozone levels in said environment.

10. The method of claim 6, further comprising monitoring ozone levels in said environment.

11. A method, comprising:
    removing ozone from an environment by filtration to provide an ozone-reduced environment, wherein said ozone reduced environment is produced by filtering an atmosphere comprising a gas selected from the group consisting of: ozone, carbon dioxide, carbon monoxide, hydrogen, helium, neon, xenon, chlorine, fluorine, oxygen, and argon through a carbon filter; and
    fabricating a micro array in said ozone-reduced environment.

12. The method of claim 11, wherein said ozone-reduced environment is contained within a housing.

13. The method of claim 11, further comprising monitoring ozone levels in said environment.

14. The method of claim 11, wherein said gas comprises a mixture of gases.

* * * * *